July 17, 1923.
A. BOHLIN
KNIFE SHARPENER
Filed April 1, 1921
1,462,080
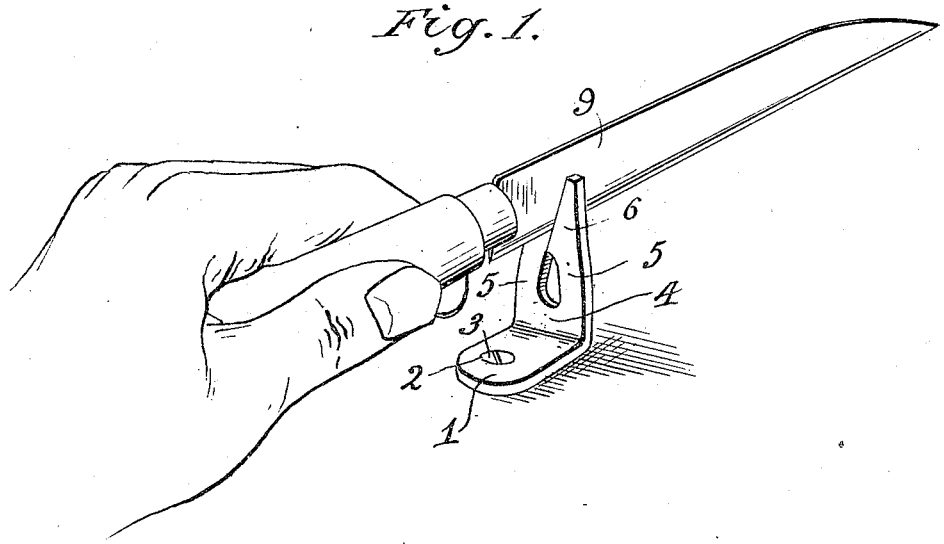
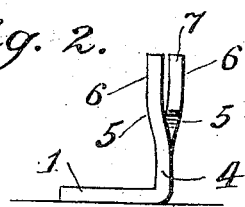 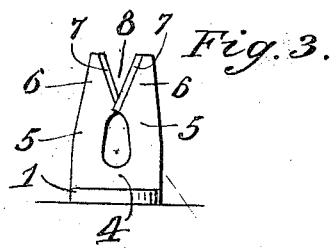
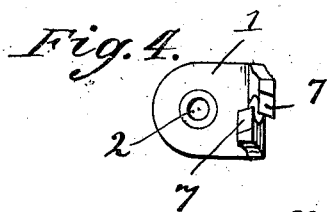
Inventor
Arvid Bohlin
By his Attorney G. J. Houtain Patented July 17, 1923.

1,462,080

UNITED STATES PATENT OFFICE.

ARVID BOHLIN, OF TRENTON, NEW JERSEY.

KNIFE SHARPENER.

Application filed April 1, 1921. Serial No. 457,620.

*To all whom it may concern:*

Be it known that I, ARVID BOHLIN, a citizen of the United States, and resident of Trenton, in the county of Mercer and State of New Jersey, have invented certain new and useful Improvements in Knife Sharpeners, of which the following is a specification.

The present invention relates to knife sharpeners, an object thereof being the provision of simple and effective means for sharpening knives which may be successfully employed by unskilled persons for the rapid production of a sharp cutting edge evenly beveled on both sides of the knife; a further object being to provide a device of this character which embodies simplicity of construction and is very durable and inexpensive, constituting a handy implement adapted for fixed attachment to the surface of a table or other object, whereby liability of losing or misplacing it is obviated, the device being especially applicable for use in the process of sharpening knives for household use, such as vegetable paring knives, carving knives, corrugated bread cutting knives, etc.

In carrying out my invention I employ, in integral formation, a base, two laterally disposed oppositely located, tapered and bevel-edged cutting members arranged one in advance of the other and laterally crossed for forming a V-shaped groove for contact with a knife edge, whereby the knife may be evenly beveled on both sides, as hereinafter fully described and specifically set forth in the appended claims.

In the accompanying drawings forming part of this specification, Figure 1 is a perspective view illustrating an embodiment of my improvements and a practical application of the invention.

Fig. 2 is a side view of the device;

Fig. 3 is a front view; and

Fig. 4 is a plan view.

In the drawings, 1 indicates a base having a hole 2 therethrough for engagement with a screw 3, whereby the device may be permanently and securely fixed to a horizontal plane surface, as shown in Fig. 1 of the drawings. Extended upwardly and at right angles from the base 1, is a bifurcated standard 4, constituting two cutting members 5, having respectively a tapered extension 6 which is provided with an inner beveled cutting edge 7, and they overlap at the bottom parts whereby a V-shaped groove is formed for receiving the edge of the knife to be sharpened, and the cutting members are arranged one in advance of the other, as clearly shown in Fig. 2 of the drawings, thus providing oppositely located beveled cutting edges ranged one in advance of the other but adapted to simultaneously contact with opposite sides of the knife edge for sharpening and evenly beveling the same at a single stroke.

The device is composed of cold rolled high carbon steel, hardened to a high degree, whereby the cutting edges are maintained in sharp and operative condition for a maximum period of time.

In the operation and use of the invention, a knife, as 9, Fig. 1 of the drawings, is slightly pressed within the groove 8, with the blade in an upright position; it is then simply drawn forwardly through said groove, whereupon a sharp edge is produced which is evenly beveled on both sides, the beveled edges 7 of the cutting members acting in unison in the process of shaping and sharpening said evenly beveled knife edge at each stroke of the knife.

I do not wish to be understood as confining myself to the specific form of sharpener as herein shown and described, as under the spirit of my invention I believe that I am entitled to employ such variations as may rightly fall within the scope of the appended claims.

Having thus described my invention, what I claim as new and desire to secure by Letters Patent, is:

1. A knife sharpener comprising, in integral formation, a base and a bifurcated standard embodying two oppositely disposed cutting members which partly overlap and are ranged one in advance of the other.

2. A knife sharpener comprising, in integral formation, a base and a bifurcated standard embodying two oppositely disposed tapered and partly overlapped cutting members having beveled cutting edges, said members ranged one in advance of the other with their cutting edges converging centrally whereby a V-shaped groove is formed for engaging a knife edge.

Signed at Trenton in the county of Mercer and State of New Jersey, this 7th day of January A. D. 1921.

ARVID BOHLIN